United States Patent [19]

Matsuo

[11] Patent Number: 4,974,154
[45] Date of Patent: Nov. 27, 1990

[54] COMPUTER WITH INSTRUCTION PREFETCH QUEUE RETREAT UNIT

[75] Inventor: Masahito Matsuo, Hyogo, Japan

[73] Assignee: Mitsubishi Denki Kaisha, Tokyo, Japan

[21] Appl. No.: 106,604

[22] Filed: Oct. 6, 1987

[30] Foreign Application Priority Data

Oct. 7, 1986 [JP] Japan .................................. 61-239566

[51] Int. Cl.$^5$ ............................................... G06F 9/38
[52] U.S. Cl. .................................. 364/200; 364/261.5; 364/263.1; 364/238.6; 364/262.4
[58] Field of Search ............................... 364/200, 900

[56] References Cited

U.S. PATENT DOCUMENTS

| | | | |
|---|---|---|---|
| 4,626,988 | 12/1986 | George | 364/200 |
| 4,679,141 | 7/1987 | Pomerene et al. | 364/200 |
| 4,691,277 | 9/1987 | Kronstadt et al. | 364/200 |
| 4,714,994 | 12/1987 | Oklobdzija et al. | 364/200 |
| 4,742,451 | 5/1988 | Bruckert et al. | 364/200 |
| 4,758,949 | 7/1988 | Wada et al. | 364/200 |
| 4,763,245 | 8/1988 | Emma et al. | 364/200 |

*Primary Examiner*—Thomas C. Lee
*Attorney, Agent, or Firm*—Dykema Gossett

[57] ABSTRACT

A computer comprises an instruction execution unit for running a first instruction loaded in an area classified by a first area recognition symbol of a storage for loading a plurality of instructions in a plurality of areas ordered by the area recognition symbols. An instruction analyzer (instruction decoding unit) is connected to said instruction execution unit for analyzing a second instruction loaded in an area classified by a second area recognition symbol. An instruction prefetch queue is connected between the instruction decoding unit and the main memory storage. A target prediction unit (branch target buffer) for predicting whether or not the second instruction is a branch instruction for running a fourth instruction loaded in an area classified by a fourth area recognition symbol is connected to the instruction prefetch queue, and an instruction prefetch queue retreat unit, wherein a part or all of the third instructions fetched in the instruction prefetch unit is stored temporarily when the target prediction unit predicts that the fourth instruction will be executed after instruction of the second instruction, is connected to the instruction prefetch queue and the instruction analyzer.

4 Claims, 2 Drawing Sheets

COMPUTER WITH INSTRUCTION PREFETCH QUEUE RETREAT UNIT

BACKGROUND OF THE INVENTION

1. Field of the Invention

The present invention relates to a computer provided with a pipeline processing function of instructions.

2. Description of the Prior Art

FIG. 2 is a block diagram of a microprocessor operating as a conventional computer provided with a pipeline processing function of instructions and a target predicting function of branch instructions. In the drawing, 1 denotes an instruction prefetch queue as an instruction prefetch device, 2 denotes an instruction decoding unit as an instruction analyzer, 3 denotes an instruction execution unit as an instruction running device, and 4 denotes a branch target buffer as a target predictor for predicting targets of branch instructions and others.

An operation of the microprocessor will be described next.

An instruction to be executed next is decoded by the instruction decoding unit 2 while instructions are executed by the instruction execution unit 3, and when instructions have been executed by the instruction execution unit 3, the next instruction already decoded by the instruction decoding unit 2 is executed quickly. In this case, the instruction prefetch queue 1 prefetches instructions from a storage (hereinafter called main storage) for storing a plurality of instructions in a plurality of areas ordered by first, second, third, fourth . . . area recognition symbols (hereinafter called addresses) according to a fixed regulation during the period of time when the main storage is not accessed, and the time required for fetching instructions is shortened by the instruction decoding unit 2 fetching the instruction data to be coded next from the instruction prefetch queue 1.

Generally in case a flow of instructions is disordered, or when a branch instruction is executed, for example, the instruction decoding unit 2 and the instruction prefetch queue 1 are canceled, and the instruction prefetch queue 1 carries out a queuing newly from the target address. That is, the instruction to be run for the first time after execution of a jump instruction must be fetched directly from the main storage, the instruction execution unit 3 must suspend execution of instructions until the instruction to be executed next is fetched and decoded, however, what is called branch target buffer 4 is used to improve the problem. The buffer is that in which an address of the branch instruction, a target address thereof and a flag indicating whether or not the branch instruction is branched actually when executed previously are stored in a set, and is a target address prediction mechanism for predicting the target address before executing the branch instruction. It has been found that a flow of program can be predicted fairly at a high probability according to how it is predicted.

Next, the operation will be described.

When an instruction data is fetched to the instruction decoding unit 2 from the instruction prefetch queue 1, the instruction decoding is commenced and the branch target buffer 4 is referred at address of the instruction. When a branching is predicted by the branch target buffer 4, the instruction prefetch queue 1 is cleared, a queuing is carried out from the predicted target address, and the fetched instruction code is delivered to the instruction decoding unit 2. Then, if the prediction is hit, the pipeline processing will not be disturbed influentially as the instruction to be executed next by the instruction execution unit 2 is already decoded by the instruction decoding unit 2.

Thus, a disturbance of the pipeline processing after execution of the branch instruction is suppressed by providing the branch target buffer 4 additionally, thereby raising an effective computing speed of the computer.

Then, an example of the pipeline processing microprocessor provided with a normal instruction prefetch queue is given in "Processor Architecture", iAPX 286 "Hardware Reference Manual" issued by INTEL in 1983.

Further, a configuration example of the branch target buffer is shown in "Branch Prediction Strategies and Branch Target Buffer Design", "COMPUTER" Volume 17 Number 1, issued by IEEE in Jan. 1984.

In the conventional computer described as above, while a disturbance of the pipeline processing is suppressed by prediction of a target address through the branch target buffer 4 provided therefor, in case a target prediction of the branch instruction is missed to no branching, an execution must be suspended until the instruction in the address indicated by a new program counter is fetched from the main storage, and thus the pipeline processing is disturbed to deteriorate an effective processing rate.

SUMMARY OF THE INVENTION

The invention has been done to solve the problem mentioned above, and its object is to obtain a computer wherein a disturbance of pipeline processing is minimized even in case a target prediction of the branch instruction is missed to no branching, thereby raising an effective processing rate.

The computer relating to the invention comprises an instruction execution unit for running a first instruction loaded in an area classified by a first area recognition symbol of a storage for loading a plurality of instructions in a plurality of areas ordered by the area recognition symbols according to a fixed regulation, an instruction analyzer for analyzing a second instruction loaded in an area classified by a second area recognition symbol while the first instruction is executed by the instruction execution unit, an instruction prefetch unit for prefetching third instructions loaded in an area classified by a third area recognition symbol, while the second instruction is analyzed by the instruction analyzer, a target prediction unit for predicting whether or not the second instruction is a branch instruction for running a fourth instruction loaded in an area classified by a fourth area recognition symbol which is not sequential to the area classified by the second area recognition symbol of the storage after execution of the second instruction before the instruction execution unit executes the second instruction and sending the target area recognition symbol or the instruction stored beforehand when branch is predicted on the branch instruction, an instruction prefetch queue retreat unit wherein a part or all of the third instruction fetched in the instruction prefetch unit is retreated temporarily when the target prediction unit predicts that the fourth instruction will be executed after execution of the second instruction; the instruction analyzer fetching in the instructions retreated from the instruction prefetch queue retreat unit when the branch didn't occur on the branch instruction notwithstanding that branch is predicted on the branch instruction.

In the invention, in case a prediction by the target prediction unit is false, and branching doesn't occur on execution of the branch instruction, the instruction retreated to the instruction prefetch queue retreat unit is loaded in the instruction analyzer.

DETAILED DESCRIPTION OF PREFERRED EMBODIMENT

Figure 1:
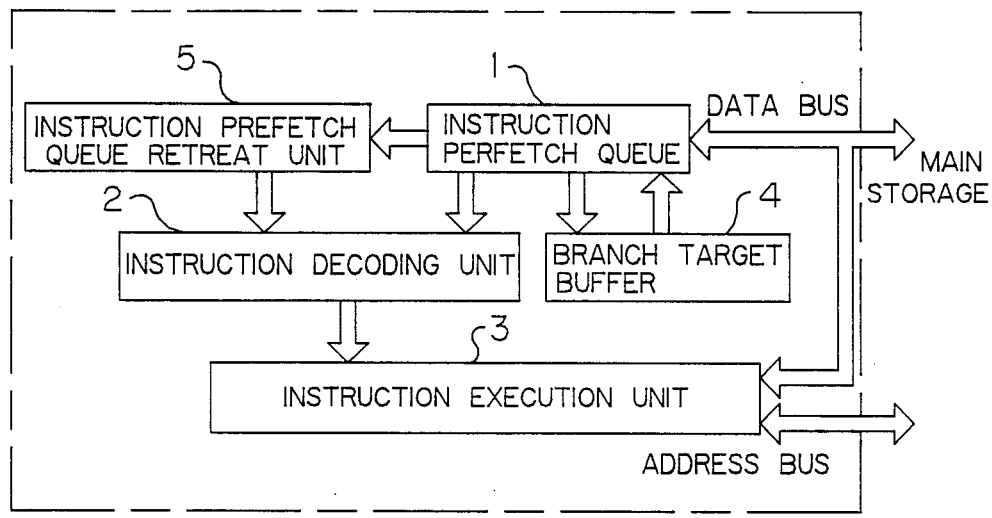
FIG. 1 is a block diagram representing a computer given in one embodiment of the invention.
Figure 2:
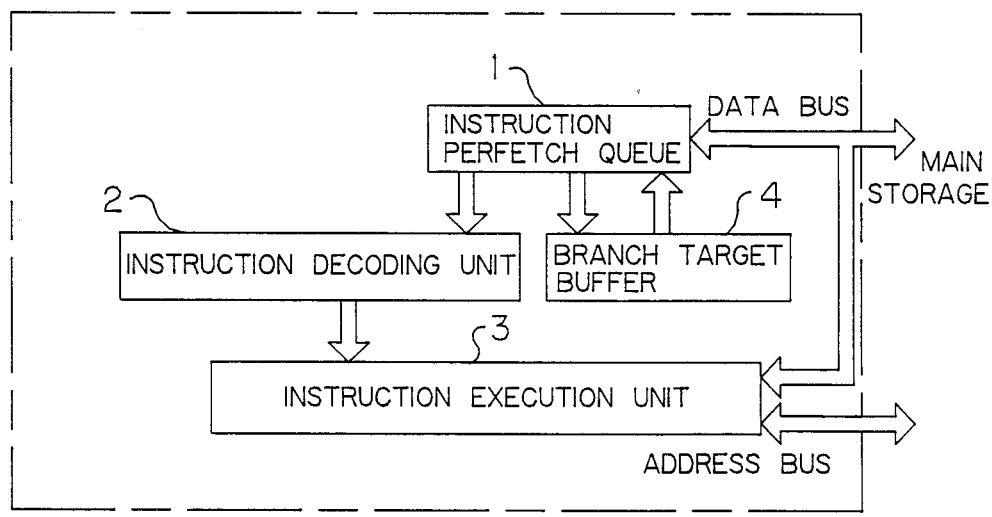
FIG. 2 is a block diagram of a conventional microprocessor provided with an instruction pipeline processing function and a branch target buffer; and, FIG. 3 is a detailed, block diagram of a preferred embodiment of the invention.
Figure 3:
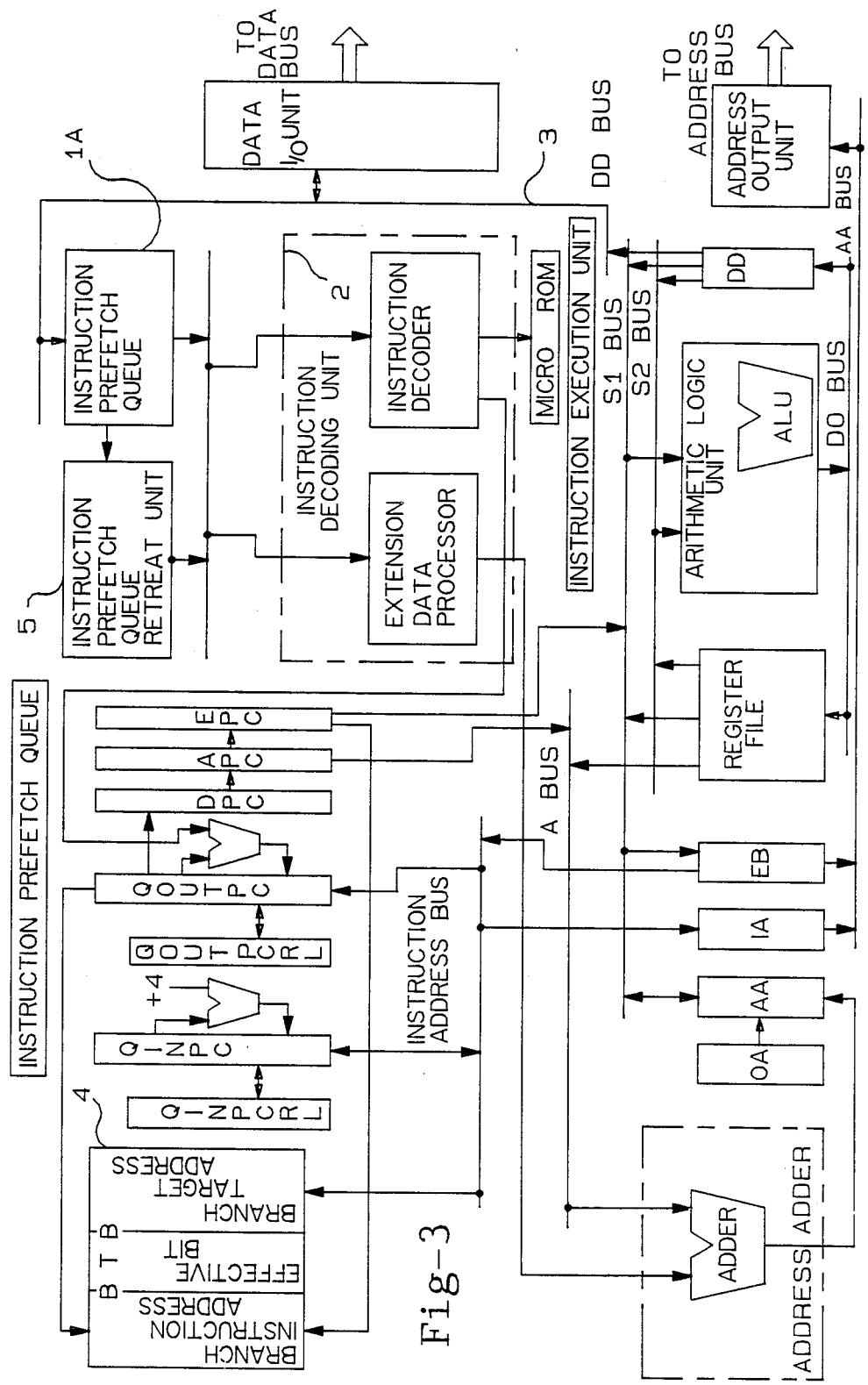

FIG. 1 is a block diagram representing a computer given in one embodiment of the invention. In the drawing, like reference numerals represent like parts in FIG. 2, and 5 represents an instruction prefetch queue retreat unit as an instruction prefetch queue retreating device.

An operation will be described next.

When an instruction data is fetched from the instruction prefetch queue 1 to the instruction decoding unit 2, an instruction decoding is commenced and the branch target buffer 4 is referred at the instruction address. When branching is predicted by the branch target buffer 4, a part or all of the content of the instruction prefetch queue 1 is retreated to the instruction prefetch queue retreat unit 5, the instruction prefetch queue 1 is then cleared, queuing is again carried out from the target address predicted by the branch target buffer 4, and then the fetched instruction data is delivered to the instruction decoding unit 2. When the prediction is hit, then the instruction to be executed by the instruction execution unit 3 next has already been run by the instruction decoding unit 2, and thus the pipeline processing will never be disturbed. Further, when the prediction is missed to no branching on a condition branch instruction, a decoded result at the instruction decoding unit 2 is canceled, the instruction prefetch queue 1 is cleared, and the instruction data retreated to the instruction prefetch queue retreat unit 5 is fetched to the instruction decoding unit 2. The prefetch queue 1 carries out queuing again from a loaded address of the instruction sequential to the instruction fetched to the instruction prefetch queue retreat unit 5. Accordingly, even in case the prediction is missed to no branching, the instruction to be executed next need not be fetched again from the main storage.

As described above, the invention relates to a computer, comprising an instruction execution unit for runing a first instruction loaded in an area classified by a first area recognition symbol of a storage for loading a plurality of instructions in a plurality of areas ordered by the area recognition symbols according to a fixed regulation, an instruction analyzer for analyzing a second instruction loaded in an area classifed by a second area recognition symbol while the first instruction is executed by the instruction execution unit, an instruction prefetch unit for prefetching third instructions loaded in an area classified by a third area recognition symbol while the second instruction is analyzed by the instruction analyzer, a target prediction unit for predicting whether or not the second instruction is a discontinuous instruction for running a fourth instruction loaded in an area classified by a fourth area recognition symbol which is not sequential to the area classified by the second area recognition symbol of the storage after execution of the second instruction before the instruction execution unit executes the second instruction, and sending the target area recognition symbol or the instruction stored beforehand when the branch is predicted, an instruction prefetch queue retreat unit wherein a part or all of the third instructions fetched in the instruction prefetch unit is retreated temporarily when the target prediction unit predicts that the fourth instruction will be executed after execution of the second instruction, the instruction analyzer fetching in the instructions retreated from the instruction prefetch queue retreat unit when the branch didn't occur on the branch instruction notwithstanding that the branch is predicted on the branch instruction, therefore a retreated instruction can be fetched in the instruction analyzer even in case the prediction is missed and thus the branch didn't occur on the branch instruction, a disturbance of the pipeline processing is suppressed thereby and an effective processing rate can be raised.

What is claimed is:

1. A computer comprising:
(a) an instruction execution unit for running a first instruction loaded in an area classified by a first area recognition symbol of a storage for loading a plurality of instructions in a plurality of areas ordered by the area recognition symbols according to a fixed regulation;
(b) an instruction analyzer connected to said instruction execution unit for analyzing a second instruction loaded in an area classified by a second area recognition symbol while said first instruction is executed by said instruction execution unit;
(c) an instruction prefetch unit connected to said instruction analyzer for prefetching and storing third instructions loaded in an area classified by a third area recognition symbol which is sequential to the area classified by said second area recognition symbol of said storage while said second instruction is analyzed by said instruction analyzer;
(d) a target prediction unit connected to said instruction prefetch unit for predicting whether or not said second instruction is a branch instruction for running a fourth instruction loaded in an area classified by a fourth area recognition symbol which is not sequential to the area classified by said second area recognition symbol of said storage after execution of said second instruction, before said instruction execution unit executes said second instruction, and sending to said instruction prefetch unit the fourth area recognition symbol when branching is predicted by said branch instruction;
(e) an instruction prefetch queue retreat unit connected to said instruction prefetch unit and said instruction analyzer, wherein a part or all of said third instructions stored in said instruction prefetch unit is stored temporarily when said target prediction unit predicts that said fourth instruction will be executed after execution of said second instruction, which is characterized in that said instruction analyzer fetches in the instructions stored in said instruction prefetch queue retreat unit when branching doesn't occur on said branch instruction, notwithstanding the fact that branching was predicted by the branch instruction; and, (f) means for clearing third instructions which are sequential to said fourth instruction from said instruction prefetch unit when a sequence of instructions is fetched from said instruction prefetch queue retreat unit, and for thereafter storing instructions subsequent to said sequence of instructions fetched from said instruction prefetch queue retreat unit in said instruction prefetch unit.

2. The computer defined in claim 1, wherein said instruction analyzer comprises an instruction decoding unit.

3. The computer defined in claim 2, wherein said instruction prefetch unit is an instruction prefetch queue.

4. A method of fetching instructions from an instruction prefetch queue retreat unit located in a computer having a memory, an instruction prefetch queue storing prefetched instructions, an instruction decoding unit, a branch target buffer, an instruction execution unit and an instruction prefetch queue retreat unit, said method comprising the steps of:

a. fetching an instruction from said instruction prefetch queue and supplying the fetched instruction to said instruction decoding unit;
 b. commencing decoding of said fetched instruction and inquiring of said branch target buffer for a target instruction address;
 c. when branching is predicted by said branch target buffer, storing a part or all the prefetched instructions of said instruction prefetch queue in said instruction prefetch queue retreat unit;
 d. clearing said instruction prefetch queue;
 e. fetching a target instruction having the target instruction address predicted by said branch target buffer and queueing additional instructions subsequent to said target instruction in said instruction prefetch queue;
 f. delivering said fetched target instruction to said instruction decoding unit;
 g. when the branching prediction is true, executing the target instruction which has been decoded by said instruction decoding unit;
 h. when the branching prediction is missed, cancelling result decoded by said instruction decoding unit, clearing said instruction prefetch queue, fetching the instructions previously stored in said instruction prefetch queue retreat unit, and storing instructions subsequent to the instructions contained in the prefetch queue retreat unit in said instruction prefetch queue.

* * * * *

UNITED STATES PATENT AND TRADEMARK OFFICE
CERTIFICATE OF CORRECTION

PATENT NO. : 4,974,154

DATED : November 27, 1990

INVENTOR(S) : Masahito Matsuo

It is certified that error appears in the above-identified patent and that said Letters Patent is hereby corrected as shown below:

Column 5, line 1, Claim 1, delete "third".

Signed and Sealed this

First Day of December, 1992

*Attest:*

DOUGLAS B. COMER

*Attesting Officer*         Acting Commissioner of Patents and Trademarks